Patented June 13, 1944

2,351,171

UNITED STATES PATENT OFFICE 2,351,171

PROCESS FOR MANUFACTURING CARBAZOLE

Viktor Weinmayr, Pitman, N. J., assignor to E. I. du Pont de Nemours & Company, Wilmington, Del., a corporation of Delaware No Drawing. Application July 2, 1943, Serial No. 493,303

9 Claims. (Cl. 260—315)

This invention relates to the manufacture of carbazoles and especially to processes for manufacturing the same from an ortho-amino-diphenyl compound, such as ortho-amino-diphenyl and substituted derivatives thereof.

Heretofore it was known that carbazole could be synthesized by heating vaporized ortho-aminodiphenyl with oxygen in the presence of a catalyst, such as an oxide of vanadium or molybdenum. This vapor phase reaction produced good conversion at 600° C. but at temperatures as low as 450°–550° C. the conversion is almost negligible. (Morgan & Walls, Journ. Soc. Chem. Ind., 57, 358 (1938).) The high temperatures necessary for this conversion, limitations of apparatus and handling inherent in the use of catalysts and high temperature vapor phase operations, the hazard from fires or explosions in vapor phase operations and other reasons make new methods of manufacture desirable.

I have now discovered that carbazole can be manufactured more advantageously from an ortho-amino-diphenyl by using other agents than air as the agent for the conversion. Accordingly, I have found that nitro-organic compounds give excellent results when used as the agent. These compounds are reactive at relatively low temperatures and in the absence of catalysts. The reaction can be carried out readily at temperatures where the reaction mass is still in the liquid phase.

It is among the objects of the invention to provide new processes for the manufacture of carbazoles from organic compounds of the diphenyl series which have one amino group ortho to the diphenyl bridge. Another object of the invention is to provide processes for manufacturing carbazoles in the liquid phase. A further object of the invention is to provide a process which can be operated at relatively low temperatures. Another object of the invention is to provide processes whereby carbazoles can be readily prepared and isolated in a form which is not associated with compounds having physical properties which render them difficult to separate from the carbazole, such as the compounds commonly associated with carbazole in coal tar. A still further object of the invention is to provide processes which can be safely and conveniently carried out either by batch methods or continuously. Still other objects of the invention will be apparent from the following description.

The objects of the invention are attained in general by heating a mixture of a compound of the ortho-amino-diphenyl series with a nitro-organic compound to a temperature which is at least sufficient to produce a fluid state of the ortho-amino compound. The carbazole is formed by ring closure effected by the action of the nitro compound, and the desired product may then be separated from the resulting mass by crystallization, distillation or other convenient means known to the art.

The invention will be more fully set forth in the following more detailed description which includes examples that are given as illustrative embodiments of the invention and not as limitations thereof. Parts are expressed in parts by weight unless otherwise noted.

Example 1

507 parts of technical ortho-amino-diphenyl are refluxed at about 300° C. and 347 parts of technical ortho-nitro-diphenyl are gradually added over a period of ten hours. During that time reflux is maintained and the temperature of the mass increases steadily until it reaches 340°–350° C. After all of the nitro body is added, heating to 340°–350° C. is continued for two hours longer. Water formed in the course of the oxidation (about 50–60 parts) is allowed to distill off.

The charge is then allowed to cool to about 180° C. and is dissolved in 800 parts of ortho-dichlorobenzene. Carbazole crystallizes from the solution upon cooling. After filtering and washing with 400 parts of solvent, 331 parts of carbazole of a purity of 98.8% by nitrogen determination and a crystallizing point of 245.5° to 246.0° C. are obtained.

Carbazole produced by the present method is of a considerably higher purity than that produced from naturally occurring sources. A good grade of commercial sublimed carbazole from coal tar had a crystallizing point of 243.5° C. After laborious and repeated purifications, this crystallizing point could be raised to 245.5° C. Carbazole obtained by the new method and from only one extraction of the crude fusion mass has a crystallizing point of 245.5° C. and this point can be raised to 246.5° C. if the extraction is combined with a simple distillation. The latter is believed to be the true crystallizing point of pure carbazole.

From the filtrate after crystallization in the proces of Example 1, 160 parts of ortho-amino-diphenyl can be recovered by concentration and distillation, if desired.

Instead of diluting the final charge with a solvent in the above process, isolation of the product from the reaction mass can be effected by distillation under atmospheric pressure or slightly reduced pressure. In such a case 320 parts of distilled carbazole of similar purity are obtained and 160 parts of ortho-amino-diphenyl can be recovered. Thus the carbazole can be obtained with a yield of 93.2% based on the amount of ortho-amino-diphenyl consumed.

Nuclearly substituted diphenylenes having an amino group in the ortho position to the diphenyl bridge and nuclear substituents in other positions are used to make the corresponding sub-stituted carbazoles just as ortho-amino-diphenyl is used to make carbazole in accordance with the process of the foregoing example. Thus, a mono-chloro-carbazole or a di-chloro-carbazole is produced by using a mono- or di-chloro-ortho-amino-diphenyl, such as 5-chloro-2-amino-di-phenyl or crude dichloro-2-amino-diphenyl instead of ortho-amino-diphenyl in the foregoing example, producing the corresponding 3-chloro-carbazole or dichloro-carbazoles, respectively. In like manner, other ortho-amino-diphenyl compounds having substituents which are not decomposed in the reaction medium can be used to produce the correspondingly substituted carbazoles. Thus ortho-amino-diphenyl substituted by any such substituents can be used to make the correspondingly substituted carbazoles.

*Example 2*

338 parts of ortho-amino-diphenyl and 41 parts of anhydrous sodium acetate are heated to 300° C. 199 parts of ortho-nitro-diphenyl are added in four parts over a period of twelve hours. During this time the charge is held at at slight boil. Due to the formation of carbazole, the temperature of the charge increases steadily and finally reaches 345°–350° C. Th fusion mass is cast into a pan, pulverized and slurried in 1000 parts of xylene at 100° C. 219 parts of carbazole having a crystallizing point of 245.5° C. are obtained.

The presence of materials in the reaction mixture which do not take part in the rearrangement commonly has no effect. Such materials are referred to herein as inert materials.

*Example 3*

84 parts of ortho-amino-diphenyl, 24 parts of ortho-nitro-diphenyl and 24 parts of anhydrous sodium carbonate are heated to the slight boil of the mass for six hours. The temperature of the reaction mass was within the range of 295°–360° C. 33.5 parts of carbazole of the usual high purity are obtained.

*Example 4*

507 parts of ortho-amino-diphenyl are heated to 300° C. and 60 parts of meta-dinitrobenzene are added over a period of ten hours. The temperature of the charge is increased during that time to 340° C. The charge is cooled to about 250° C. and unchanged ortho-amino-diphenyl and the carbazole formed are distilled out with upperheated steam. Carbazole similar to that obtained in Example 1 is obtained with a yield of 60%–70% of theory.

A wide range of reaction temperatures above 250° C. can be used, either where the ortho-amino-diphenyl is present as a liquid or in vapor phase. The best operating temperatures are within the range of about 295° to about 360° C.

Nitro-substituted organic compounds in general are used to make the carbazoles, the choice being dependent on considerations such as availability and special characteristics when used in media and at the temperatures to be employed. It is desirable to use a nitro-substituted organic compound which boils approximately at or above the boiling point of the ortho-amino-diphenyl employed and is relatively stable to heating at the temperature employed, but when operating in the liquid phase nitro organic compounds can be used which cannot be distilled without decomposition. The preferred agents for use in the process are nitro-substituted compounds of the benzene series, those which are relatively stable to heating at the temperatures employed in the process being in general the more desirable from the standpoint of safe operation. As illustrative of the many nitro-substituted organic compounds which can be used instead of the nitro compounds specified in the examples are nitro-benzene, di-nitro-benzenes, nitro-chloro-benzenes, meta-nitro-benzene-sodium sulfonate, the various nitro-naphthalenes, the various nitro-anthraquinones, the various nitro-diphenyl compounds, nitro-propanes, 2-chloro-2-nitro-propane and dichloro-nitro-propane. Under conditions where the nitro body vaporizes at atmospheric pressure considerably below the temperature of vaporization of the 2-amino-diphenyl, it is desirable to operate in closed vessels under pressure. It is preferable to proportion the reactants in the ratio of about one molecular proportion of the organic nitro compound to three molecular proportions of the ortho-amino-diphenyl.

From the foregoing disclosure it will be recognized that the invention is susceptible of modification without departing from the spirit and scope thereof and it is to be understood that the invention is not restricted to the specific illustrations thereof herein set forth.

I claim:

1. The process of making a carbazole which comprises heating a mixture comprising an ortho-amino-diphenyl and an organic nitro-substituted compound.

2. The process of making a carbazole which comprises subjecting a compound of the ortho-amino-diphenyl series to the action of a nitro-substituted organic compound, and heating to a temperature higher than about 250° C.

3. The process in accordance with claim 2 in which the temperature of heating is not more than about 360° C.

4. The process of making carbazole which comprises subjecting ortho-amino-diphenyl to the action of a nitro-substituted organic compound, and heating to a temperature higher than about 250° C.

5. The process in accordance with claim 4 in which the temperature of heating is not more than about 360° C.

6. The process in accordance with claim 4 in which the nitro-substituted compound is a compound of the benzene series.

7. The process in accordance with claim 4 in which the reaction mixture comprises ortho-amino-diphenyl and a mono-nitro-diphenyl compound.

8. The process in accordance with claim 4 in which the reaction mixture comprises ortho-amino-diphenyl and a di-nitro-benzene.

9. The process in accordance with claim 4 in which the reaction mixture comprises ortho-amino-diphenyl and meta-dinitro-benzene.

VIKTOR WEINMAYR.